United States Patent [19]
Kagata

[11] 3,765,521
[45] Oct. 16, 1973

[54] FREE WHEEL HUB MECHANISM
[75] Inventor: Tooru Kagata, Toyota, Japan
[73] Assignee: Aisin Seiki Kabushiki Kaisha, Kariya City, Aichi Pref., Japan
[22] Filed: May 25, 1972
[21] Appl. No.: 256,764

[30] Foreign Application Priority Data
May 25, 1971  Japan.............................. 46/035697

[52] U.S. Cl........................ 192/35, 192/43, 192/75
[51] Int. Cl........................ F16d 41/00, F16d 11/06
[58] Field of Search...................... 192/35, 36, 41 R, 192/43, 72, 75, 76

[56] References Cited
UNITED STATES PATENTS
| | | | |
|---|---|---|---|
| 3,261,437 | 7/1966 | Kramm............................. | 192/35 X |
| 2,301,849 | 11/1942 | Bialy................................ | 192/75 X |
| 1,575,027 | 3/1926 | Barnes.............................. | 192/43 X |
| 3,656,597 | 4/1972 | Gruchmann........................ | 192/35 |
| 2,194,228 | 3/1940 | Jex.................................... | 192/75 |

Primary Examiner—Allan D. Herrmann
Attorney—Norman F. Oblon et al.

[57] ABSTRACT

A free wheel hub mechanism for a vehicle including an axle shaft for the front wheels adapted for selectively receiving a driving force from a vehicle engine, a cam member rotatable with the axle shaft, a non-drive member operatively connected to the front wheels and frictional means disposed between the cam member and the non-drive member, the frictional means being automatically and frictionally engaged with the non-drive member by the cam member when driving force is transmitted to the axle shaft and being automatically disengaged from the non-drive member when the driving force is interrupted, whereby the operator automatically has either a rear two wheel drive or a four wheel drive, and the front driving system is not rotated while the rear two wheel drive is effective.

5 Claims, 3 Drawing Figures

PATENTED OCT 16 1973      3,765,521

FREE WHEEL HUB MECHAMISM

BACKGROUND OF THE INVENTION

This invention relates to free wheel hub mechanisms for vehicles, and more particularly relates to free wheel hub mechanisms of the kind in which the driving connection between the engine and the front wheels is established or interrupted according to the driving conditions and the requirement for either two or four wheel drive.

Conventionally, when an operator adjusts a transfer means connected to the engine to obtain two wheel drive, for example, when the vehicle is running under the rear wheel drive, a front wheel driving system, which comprises an axle shaft for the front wheels, a differential device and the like, becomes directly connected with the front wheels. Therefore, the front wheel driving system will be raced by the rotation of the front wheels even when it is not necessary that the front wheel driving system acts as the vehicle driving system, or when a four wheel drive is needed. Consequently, this conventional arrangement has various drawbacks and disadvantages, as follows. Namely, the lifetime of the arrangement, especially of a plurality of bearings provided therein, will be decreased. In addition, noises will be generated at the mechanical connecting parts in the front wheel driving system and the amount of consumption of fuel will be further increased because the front wheel driving system is raced.

On the other hand, it has been proposed that conventional free wheel hub mechanisms be provided with manual locking means allowing the front wheels to rotate regardless of the rotation of the front axle shaft. Accordingly, when rear wheel drive only is established by manual adjustment of the transfer means, the front wheel driving system of this mechanism will not be raced. However, it will be noted that four wheel drive will still only be established when the transfer means is manually adjusted into its four wheel drive position. For the establishment of four wheel drive in this case, besides the adjustment of the transfer means, the operator also must adjust the manual locking means to the locking position in which the engine is drivingly connected to the front wheels. In addition, when the operator adjusts the locking means, he must get off the vehicle because the wheel hub mechanism is provided between the axle shaft and the wheel. Obviously, he must also get off the vehicle in order to subsequently readjust the locking means back to its rear two wheel drive state from its four wheel drive condition.

SUMMARY OF THE INVENTION

Therefore, it is an object of the present invention to provide an improved wheel hub mechanism overcoming the above-mentioned various drawbacks.

It is another object of the present invention to provide an improved wheel hub mechanism wherein two wheel drive or four wheel drive is automatically established.

It is a further object of the present invention to provide an improved wheel hub mechanism wherein the driving connection between the engine and the front wheels is automatically established when the driving force from the engine is transmitted to the driving system thereof and the driving connection is automatically interrupted when the driving force is interrupted.

It is a still further object of the present invention to provide an improved wheel hub mechanism wherein the driving system will not be rotated when a driving force is not transmitted thereto.

The foregoing objects are achieved according to the present invention through the provision of a free wheel hub mechanism featuring an axle shaft for the front wheels adapted to selectively receive a driving force from the vehicle engine and having a cam member rotatable therewith, a non-drive member connected to the front wheels and frictional means disposed between the cam member and non-drive member being automatically frictionally engageable with the non-drive member upon rotation of the cam member when the driving force is transmitted to the axle shaft and disengaged when the driving force is interrupted. Thus, wheel rotation will not cause rotation of the axle shaft in two wheel drive operation.

BRIEF DESCRIPTION OF THE DRAWINGS

These and further objects, features and attendant advantages of the present invention will be more fully appreciated as the same becomes better understood from the following detailed description when considered in connection with the accompanying drawings wherein like reference characters designate like or corresponding parts throughout the several views, and in which.

DETAILED DESCRIPTION OF THE INVENTION

Figure 1:
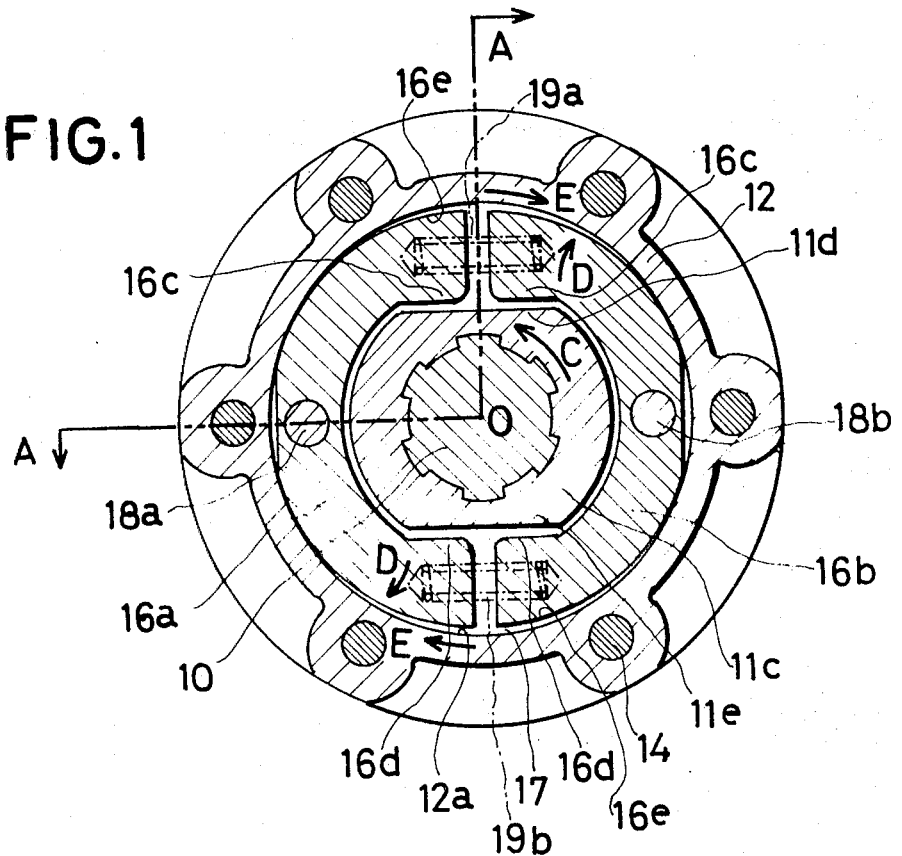
FIG. 1 is a cross-sectional view of a free wheel hub mechanism according to the present invention.
Figure 3:
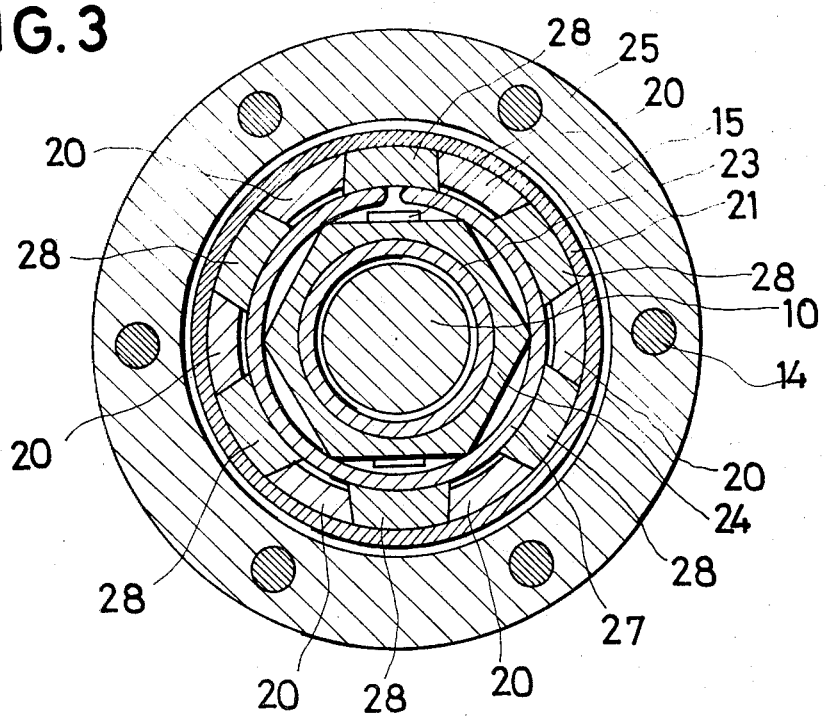
FIG. 3 is a sectional view taken long line B—B of FIG. 2.

Referring now to the drawings, the reference numeral 10 denotes an axle shaft for the front or rear wheels, not shown, adapted for receiving a driving force from a vehicle engine upon the manual adjustment of a transfer means, not shown. The axle shaft 10 has a plurality of splines 10a formed on the outer periphery thereof. A cam or drive member generally designated by reference numeral 11 is formed with a plurality of splines 11a which are engaged with the splines 10a of the axle shaft 10 so that the cam member 11 is rotated with the axle shaft 10 when the driving force is transmitted to the shaft 10. The cam member 11 comprises an annular portion 11b which supports rotatably at the outer periphery thereof a non-drive member or case 12 and a recessed inner portion 11c having the outer periphery thereof formed into two diametrically opposed planar surfaces to provide cam portions 11d and 11e. A case cover 13 is secured by bolts 14 to the case 12 which is in turn secured to a flange 15 by the same bolts 14. The flange 15 is operatively connected to the wheel, whereby the flange 15 and the case 12 are rotated with the wheel.

Figure 2:
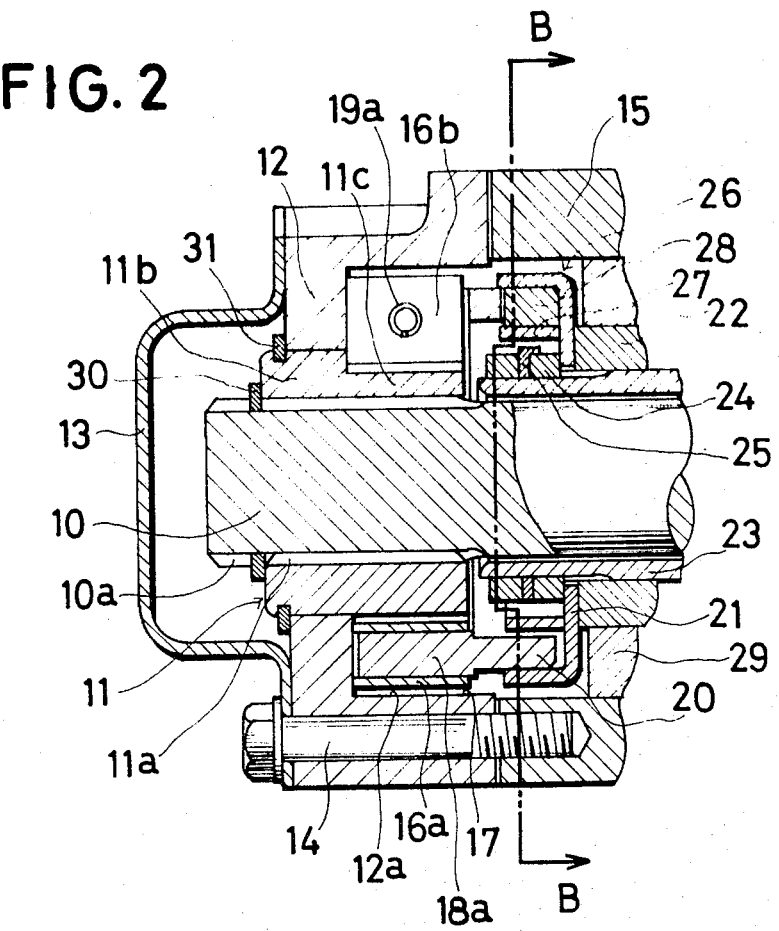
FIG. 2 is a sectional view taken along the line A-O-A of FIG. 1.

A pair of frictional members or pieces 16a and 16b each being of arcuate or half-circle configuration, is disposed between an inside surface 12a of the case 12 and the recessed inner portion 11c of the cam member 11. Each of the pieces 16a and 16b is formed with cam portions 16c and 16d at its ends, or substantially being diametrically opposed, which are contacted with the cam portions 11d and 11e, respectively, of the recessed portion 11c upon rotation of the cam member 11. A gap 17 is provided between the inside surface 12a of the case 12 and the outside peripheral surface 16e of each piece. A pair of pins 18a and 18b are pivotally mounted on the two pieces 16a and 16b, respectively, whereby the pieces 16a and 16b are expanded radially and outwardly around the pins 18a and 18b under the influence of a clutch assembly generally designated by the reference numeral 26 when the cam member 11 is rotated, as will be described in further detail hereinafter. A pair of springs 19a and 19b are provided, being respectively disposed between the respective opposite end portions of the pieces 16a and 16b, to bias the pieces 16a and 16b into the neutral positions shown in FIG. 2.

A connecting means between the clutch assembly and the pieces 16a and 16b is provided by pins 18a and 18b which are formed integrally with a cage 20 having a plurality of annularly oriented projecting portions at the inner end thereof, being shown as six in number. The six projecting portions of the cage 20 are fitted and supported in an inside periphery of an outer race 21 which is pressed against a stationary portion 22 of the vehicle and is secured to a knuckle 23 by a nut 24. A washer 25 prevents the nut 24 from rotating. The clutch assembly 26 includes the outer race 21, a plurality of bush members 28 disposed within the outer race 21 and fitted between the projecting portions of the cage 20, and a spring band 27 disposed between the bush members 28 and the nut 24. The bushes 28 are always biased radially outwardly by the biasing force of the spring band 27, thereby being pressed against the outer race 21.

A bearing 29 is provided between the flange 15 and the stationary portion 22. A snap ring 30 is fitted to the shaft 10 for preventing leftward movement of the cam member 11, as viewed in FIG. 2, and a snap ring 31 is fitted to the cam member 11 for preventing leftward movement of the case 12, also as viewed in FIG. 2.

In operation, assuming that the front wheel drive system is connected to the engine by manual adjustment of the transfer means, the axle shaft 10 receives the driving force from the engine and is rotated thereby and the cam member 11 splined to the axle shaft 10 is rotated therewith. Assuming that the cam member 11 is rotated in the direction of the arrow C, shown in FIG. 1, the cam portions 11d and 11e of the recessed portion 11c engage, respectively, with the cam portions 16c and 16d of the pieces 16a and 16b, thereby causing the pieces 16a and 16b to expand radially outwardly. Thus, the pieces 16a and 16b are rotated in the directions of the arrows D, respectively. At this time, the clutch assembly 26 is in a state of operation by the spring band 27 so that the pivot pins 18a and 18b act as fulcrums against the rotation of the pieces 16a and 16b. Accordingly, the outer peripheries of the pieces 16a and 16b are brought into pressure contact with the inside surface 12a of the case 12 so as to rotate the case 12. By this pressure contact, the pieces 16a and 16b receive the torque or the resistance from the inside surface 12a in the direction of the arrow E, and, therefore, the pieces 16a and 16b are permitted to further rotate. Namely, a servo effect will be produced at this time. As is clear from hereinbefore, the driving force transmitted from the engine drives the wheels through the axle shaft 10, the cam member 11, pieces 16a and 16b and the case 12. At this time, all the parts are rotated as a unit as though they were integrally formed as one body, but the bushes 28 are allowed to slide with respect to the outer race 21.

Next, assuming that the driving force to the front driving system is interrupted by manual adjustment of the transfer means, the pair of springs 19a and 19b causes the pieces 16a and 16b to move into their neutral positions with respect to the shaft 10. Upon rotation of the wheels, the case 12 is rotated with the wheels through the flange 15. However, the pieces 16a and 16b are then sliding with respect to the inside surface 12a of the case 12. That is to say, the wheels will be rotated without causing rotation of the axle shaft 10. Thus the shaft 10 is not rotated unless the driving force is transmitted thereto.

Various other modifications and variations of the present invention are obviously possible in light of the above teachings. It is to be understood, therefore, that within the scope of the appended claims, the invention may be practiced otherwise than as specifically described herein.

Accordingly, what is claimed as new and desired to be secured by letters patent of the United States is:

1. A free wheel hub mechanism for a vehicle characterized by an axle shaft adapted to receive a driving force from an engine of the vehicle, comprising:

a drive member connected to said axle shaft for rotation thereby and being formed with diametrically opposed parallel planar cam portions on the outer peripheral surface thereof;

a non-drive member having an inside surface of substantially cylindrical configuration coaxial with said axle shaft and said drive member and operatively connected to wheels of said vehicle so as to rotate therewith; and first and second frictional pieces of semi-circular configuration being disposed between said drive member and said non-drive member, each of said frictional pieces having opposing parallel planar cam portions on the inner surface thereof adjacent the diametrically opposed ends thereof being engageable with said cam portions of said drive member when said axle shaft receives said driving force, whereby the outer peripheral surfaces of said frictional pieces are automatically and frictionally engaged with said non-drive member by said drive member when said driving force is transmitted to said axle shaft and are automatically disengaged from said non-drive member when said driving force to said axle shaft is interrupted.

2. A free wheel hub mechanism as claimed in claim 1, wherein spring means are inserted between said first and second pieces for biasing said first and second pieces into a neutral position.

3. A free wheel hub mechanism as claimed in claim 1, further comprising:

a clutch assembly disposed between said axle shaft and said non-drive member; and a connecting means for connecting said first and second pieces to said clutch assembly.

4. A free wheel hub mechanism as claimed in claim 3, wherein said connecting means comprises:

pins fitted, respectively, in said first and second pieces; and a cage integrally formed with said pins and operatively connected to said clutch assembly.

5. A free wheel hub mechanism as claimed in claim 4, wherein said clutch assembly comprises:

an outer race secured to a stationary portion of the vehicle;
a plurality of bush means mounted in said outer race; and
resilient means for biasing said bush means toward said outer race, said cage being inserted between said bush means whereby said frictional means is rotated around said connecting means when said frictional pieces receives said driving force and said bush means are slidable in said outer race when a driving connection between said drive member and said non-drive member is established.

* * * * *